United States Patent [19]
Yang et al.

[11] Patent Number: 5,977,289
[45] Date of Patent: Nov. 2, 1999

[54] COLORLESS ORGANIC-SOLUBLE AROMATIC POLY(ETHER-IMIDE)S, THE ORGANIC SOLUTIONS AND PREPARATION THEREOF

[75] Inventors: Chin-Ping Yang; Sheng-Huei Hsiao, both of Taipei, Taiwan

[73] Assignee: National Science Council, Taiwan

[21] Appl. No.: 09/135,891

[22] Filed: Aug. 18, 1998

[51] Int. Cl.[6] .......................... C08G 14/09; C08G 69/26; C08G 73/10; B05D 3/12
[52] U.S. Cl. .......................... 528/185; 528/171; 528/172; 528/173; 528/188; 528/220; 528/229; 528/350; 528/174; 528/351; 427/371; 427/372.2; 548/461; 548/462; 549/436; 549/437
[58] Field of Search .................................... 548/461, 462; 528/185, 171; 427/371, 372.2

[56] References Cited

U.S. PATENT DOCUMENTS 5,268,487  12/1993  Yang et al. .............................. 548/456
5,414,070  5/1995   Yang et al. .............................. 528/310

OTHER PUBLICATIONS

Liaw et al., Synthesis and Properties of Polyimides Derived from 1,4–Bis(4–aminophenoxy)–2–tert–butylbenzene, Polymer Journal, vol. 28, No. 11, pp. 970–975 (1996).

*Primary Examiner*—Robert W. Ramsuer
*Assistant Examiner*—Jane C. Osweski
*Attorney, Agent, or Firm*—Fish & Richardson P.C.

[57] ABSTRACT

The present invention provides a series of easily processable poly(ether-imide)s that are organic-soluble and can afford colorless films, their organic solutions and their manufacturing process. The poly(ether-imide) is prepared from a dianhydride and a diamine, wherein the dianhydride is a bis(ether anhydride) having tert-butyl group, i.e. 1,4-bis(3,4-dicarboxyphenoxy)-2-tert-butylbenzene dianhydride. The present invention is also directed to synthesis of this special dianhydride.

15 Claims, 1 Drawing Sheet

5,977,289

COLORLESS ORGANIC-SOLUBLE AROMATIC POLY(ETHER-IMIDE)S, THE ORGANIC SOLUTIONS AND PREPARATION THEREOF

FIELD OF THE INVENTION

The present invention relates generally to a series of colorless and organosoluble poly(ether imide)s (PEIs) bearing tert-butyl being prepared from the bis(ether anhydride) with various aromatic diamines and more particularly to a novel aromatic bis(ether anhydride) compound, 1,4-bis(3,4-dicarboxyphenoxy)-2-tert-butylbenzene dianhydride, useful in the synthesis of the colorless and organosoluble poly(ether imide)s.

BACKGROUND OF THE INVENTION

Aromatic polyimides were well-known as polymeric materials of high performance for their excellent thermal stability and balanced mechanical and electric properties. Polyimides were mainly used in the aerospace and electronic industries in the forms of films and moldings. Other uses for these polymers such as adhesives, gas separation membranes, composite matrices, coatings, and foams were rapidly increasing. However, aromatic polyimides are difficult to be processed because of high softening temperatures and limited solubility in commercially available solvents; accordingly the research and improvement of their solubility or heat plasticity without decreasing their original excellent characteristics were the aims of the present scientists.

The literature is flooded with claims of polyimides according to our specific paper and patent search for soluble polyimides based on dianhydride. Most of the literature described the improvement of diamine in the poly(ether imide)s polymerization and relatively less literature described about the invention of dianhydrides in the poly(ether imide)s. The new dianhydrides used in improvement of soluble polyimides were usually cyclo-paraffin system, diphenylsulfone tetracarboxylic dianhydride (DSDA) system and 2,2'-bis(3,4-dicarboxyphenyl)hexafluoropropane dianhydride (6FDA) system. Polyimides with ortho-linkage aromatic groups and/or the diether dianhydride system containing the cardo pendant group could also improve the solubility. Among these soluble polyimides, up to the present, those with better effects were of 6FDA system. Polyimides with the paraffin ring system were poorer in thermal stability; polyimides with the DSDA system exhibited less solubility improvement; and polyimides with ortho-linkage aromatic groups and/or the diether dianhydride system containing the cardo pendant group were adversely affected in the degree of polymerization and easily decomposed by concentrated sulfuric acid.

Colorless or light-color PIs have an increasing demand in the applications of monitors, optical devices and fibers, etc. Basically, the aromatic PIs are deep-yellow or red-brown. Up to the present, the PIs of the 6FDA system and of the diether dianhydride system containing the cardo pendant group have better colorless property. However, the former are relatively expensive, and the latter as described above are poor in the degree of polymerization, mechanical and thermal properties. Thus, a lot of effort and attempts have been made to improve the processing and colorless properties of the aromatic polyimides.

Our search results for soluble polyimides based on dianhydride in literature and patent are listed as follows:

(a) Patent list
  JP 03,243,629(1990); Chemical Abstract 116: 130366y
  JP 01 22,963(1989); Chemical Abstract 111: 155040x
  JP 64 00,121(1989); Chemical Abstract 111: 58573r
  JP 61,174,974(1986); Chemical Abstract 106: 103939z
  JP 61, 171,762(1986); Chemical Abstract 106: 34788k
  JP 59,199,720(1984); Chemical Abstract 102: 114157m (b) Paper list
  Koo S.-Y; etc., J. Appl. Polym. Sci. 61(7), 1197(1996).
  Bryant, R. G., High Perform. Polym. 8(4), 607(1996).
  Young, P. R.; etc., J. Polym. Sci., Part A: Polym. Chem. 28(11), 3107(1990).
  Omote, T.; etc., J. Appl. Polym. Sci. 38(3), 389(1989).
  Kusama, M.; etc., Tokyo Kogei Daigaku Kogakubu Kiyo 11, 49(1988).
  Eastmond, G. C.; etc., Polymer, 34, 2865(1994); 35, 5418(1994).
  Eastmond, G. C.; etc., Macromolecules, 28, 2140(1995).
  Hsiao S.-H.; Yang C.-P.; Chu K.-Y., Macromolecules, 30, 165(1997).
  Hsiao S.-H.; Yang C.-P.; Chu K.-Y., Macromol. Chem. Phys. 198, 2153(1997).

SUMMARY OF THE INVENTION

The primary objective of the present invention is therefore to provide a series of organosoluble and colorless poly(ether imide)s (PEIs) with excellent thermal and mechanical properties.

In the present invention, a new bis(ether dianhydride), 1,4-bis[3,4-dicarboxyphenoxy]-2-tert-butylbenzene dianhydride (abbreviated as BDP-tBD; I), was synthesized by using tert-butylhydroquinone. This new bis(ether dianhydride), BDP-tBD, is useful for preparing colorless and organosoluble poly(ether imide)s (PEIs) by carrying out a ring-opening polyaddition reaction with various aromatic diamines to poly(amic acid)s followed by a chemical or thermal cyclodehydration to the PEIs. The poly(ether imide)s (PEIs) bearing tert-butyl prepared in accordance with the present invention showed excellent organosolubility, colorless, high degree of polymerization ($\eta_{inh} \geq 1$), mechanical and thermal properties, especially they are difficult to be decomposed by concentrated sulfuric acid. Compared with the conventional polyimides based on 6FDA, the PEIs prepared in the present invention show more colorless.

This present invention also provides an organic solution of poly(ether imide) prepared by dissolving the organosoluble poly(ether imide) of the prevent invention in an organic solvent selected from the group consisting of N-methyl-2-pyrrolidone (NMP), N,N-dimethylacetamide (DMAc), N,N-dimethylformamide (DMF), dimethyl sulfoxide (DMSO), m-cresol, pyridine (Py), tetrahydrofuran (THF), chloromethane and chloroethane.

The present invention further discloses a method for forming a poly(ether imide) film comprises mixing the poly(ether imide) of the present invention and an organic solvent; casting or coating the resulting organic solution on a substrate to form a layer; and removing said solvent from said layer to form a poly(ether imide) film.

DETAILED DESCRIPTION OF THE INVENTION

Figure 1:
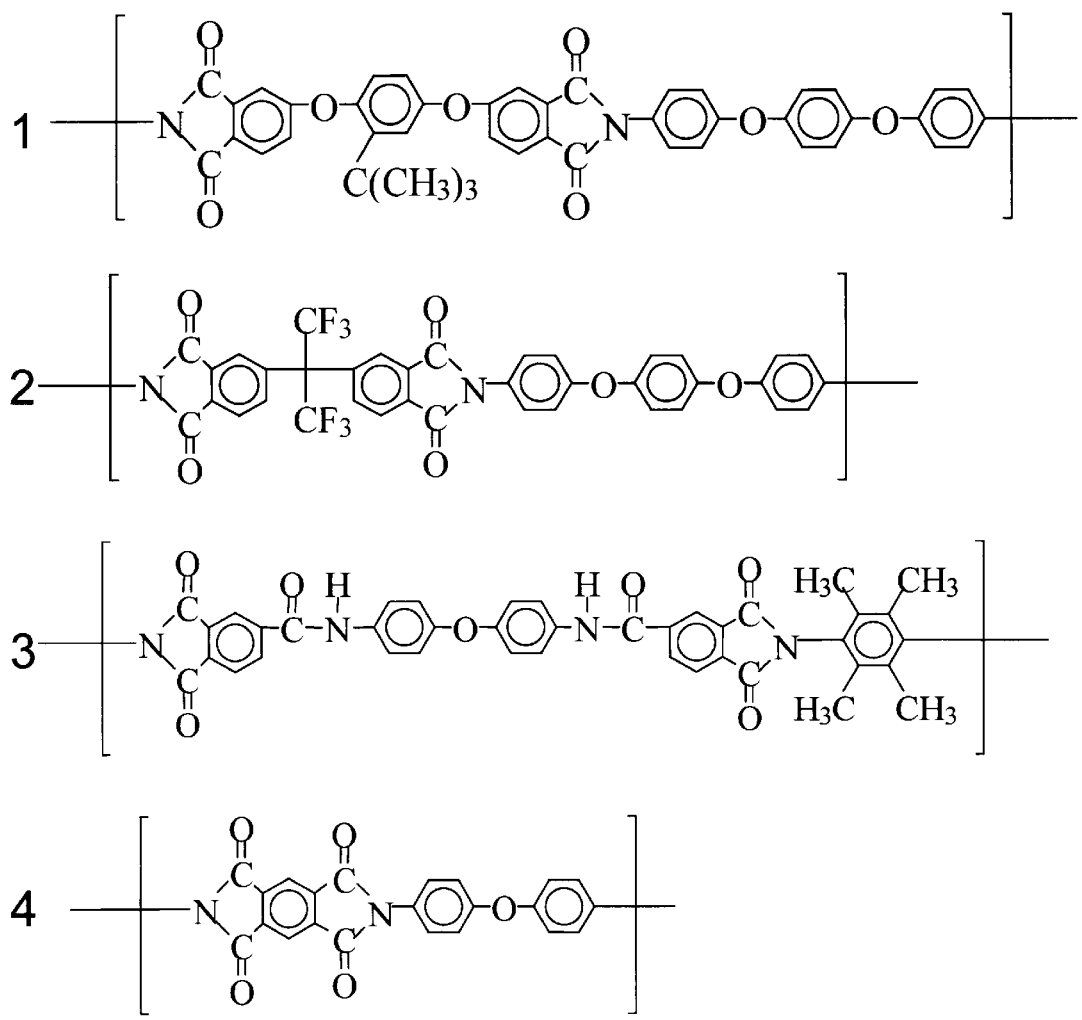
FIG. 1 shows visible light absorption spectra of a poly(ether imide) of the present invention (curve ①) and the conventional polyimides (curves ②, ③ and ④) in a range of various wavelength, wherein the poly(ether imide) of the present invention (curve ①) shows the best colorless property.
Figure 1:
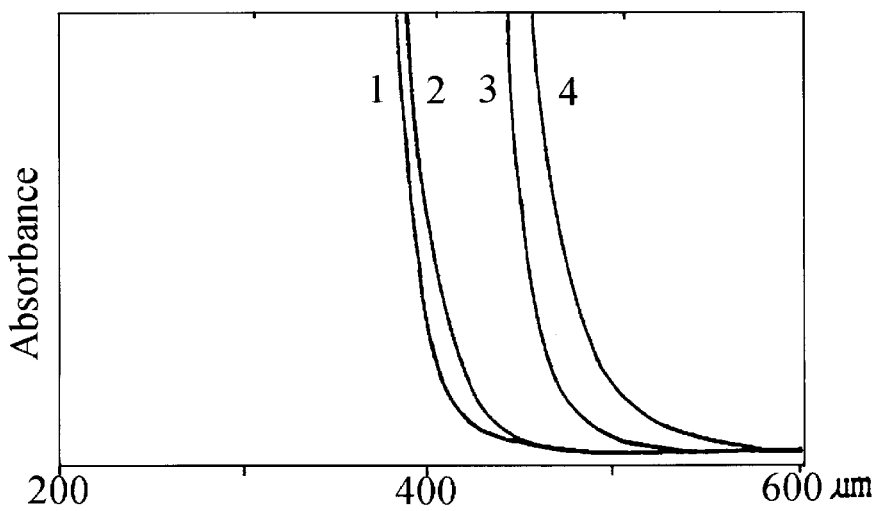

In this present invention, a new bis(ether dianhydride), 1,4-bis[3,4-dicarboxyphenoxy]-2-tert-butylbenzene dianhydride, is prepared and used in the preparation of poly(ether imide)s by carrying out a ring-opening polyaddition reaction with various aromatic diamines to poly(amic acid)s followed by a chemical or thermal cyclodehydration to the PEIs. The new bis(ether dianhydride), 1,4-bis(3,4-dicarboxyphenoxy)-2-tert-butylbenzene dianhydride (abbreviated as BDP-tBD), has the following formula I:

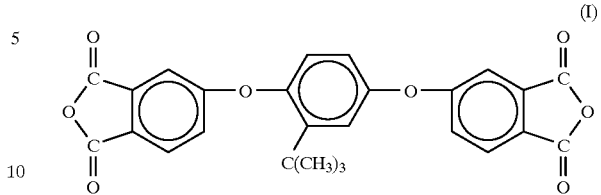

In the preparation of poly(ether imide)s (II) according to the present invention, the diamine may be replaced by a diisocyanate. The reaction equation is shown as follows:

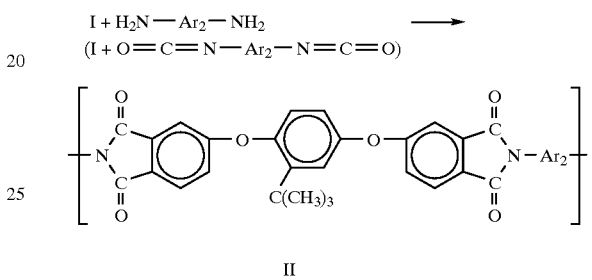

wherein $Ar_2$ is

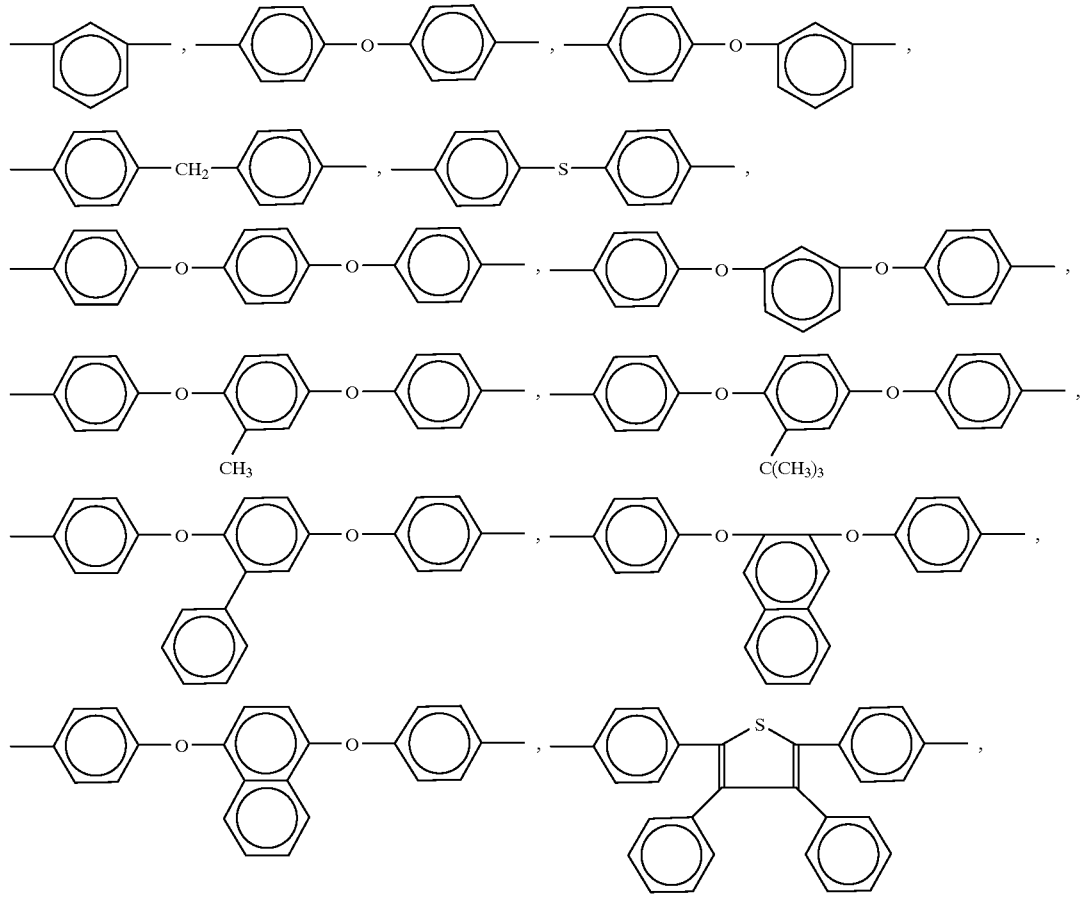

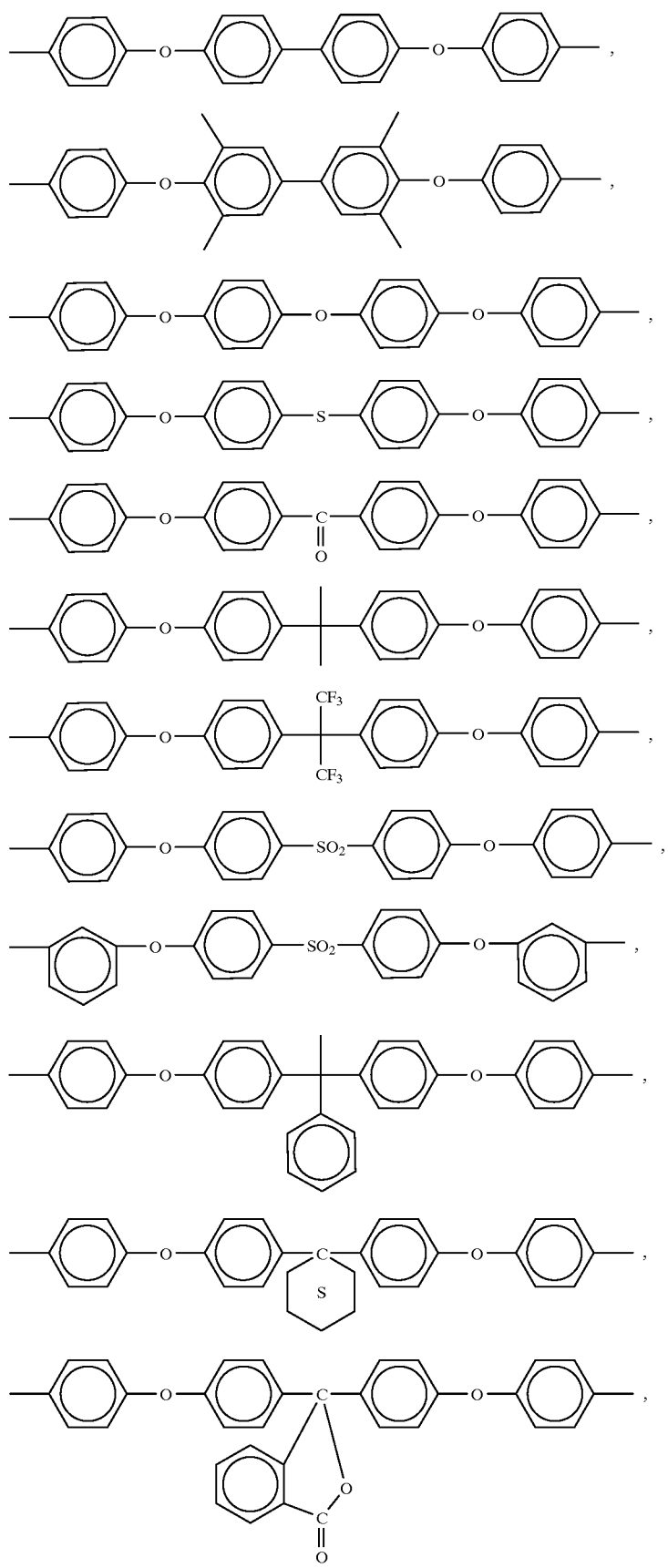

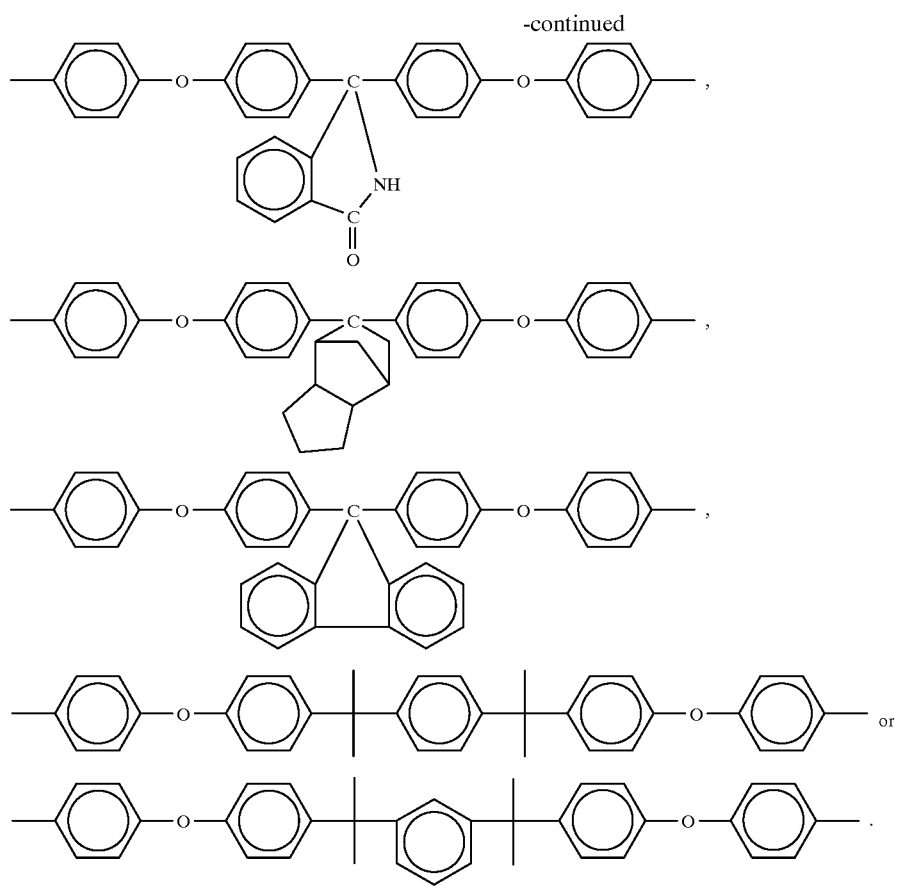
In the preparation of poly(ether imide)s according to the present invention, a different dianhydride may be used together with the BDP-tBD (I) to react with a diamine to obtain a poly(ether imide) copolymer (III), as shown in the following reaction equation (2).
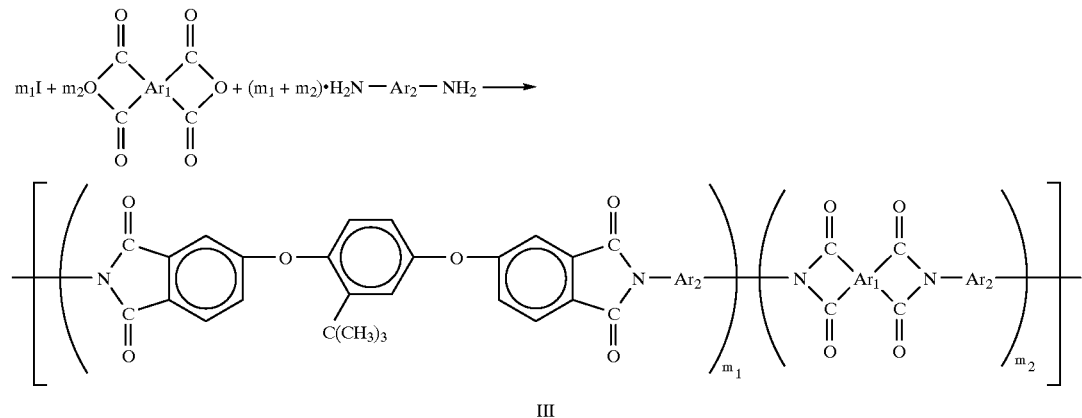
(2)
wherein $m_1$ and $m_2$ are integers, $Ar_2$ is defined as above, and $Ar_1$ represents

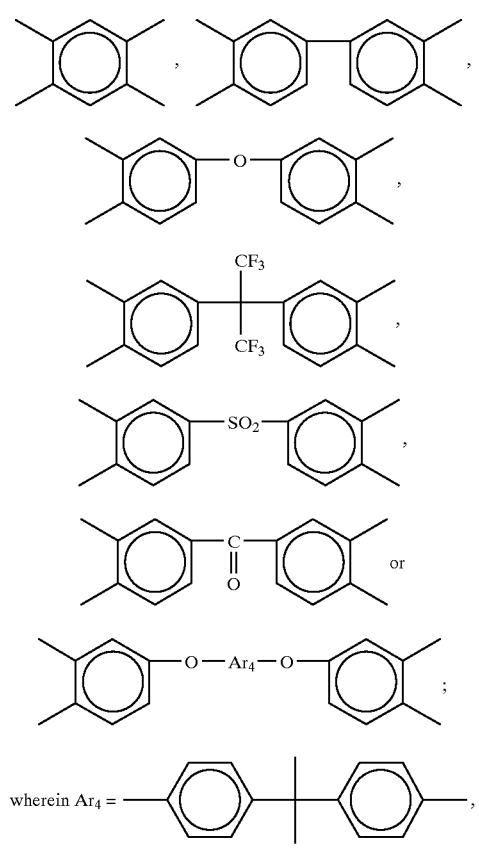
wherein Ar₄ =
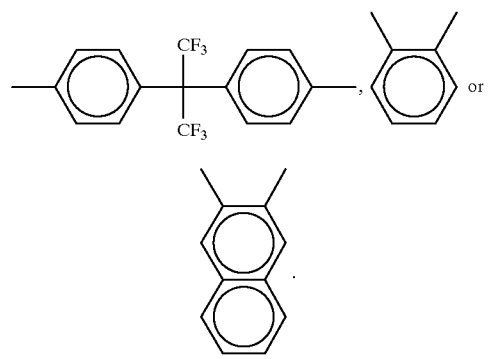
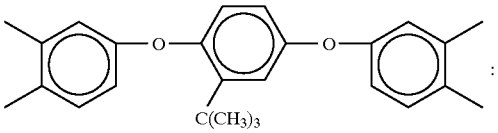
Preferably, the poly(ether imide) copolymer (III) has
Selectively, a suitable amount of unsaturated monoanhydride could be added to the reaction (1) or (2) for preparing a cross-linkable PEIs (IV), as shown in the following reaction equation (3).
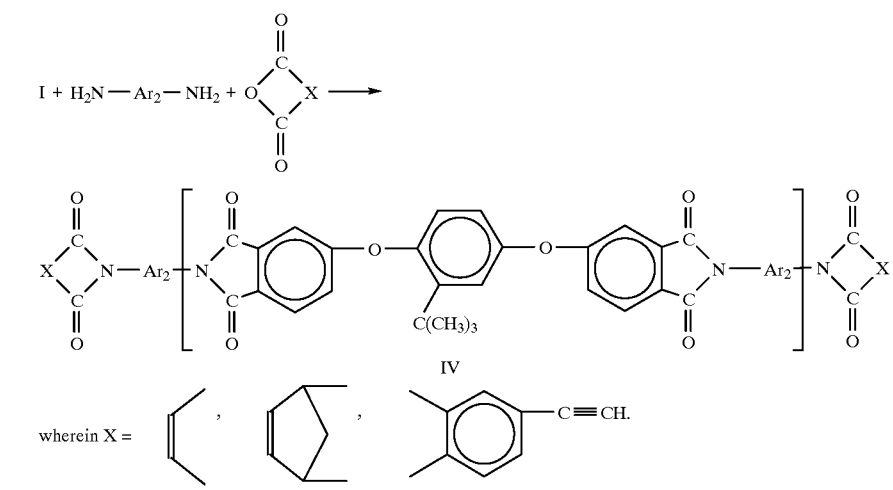

It is apparent that more than one diamines can be used in the above reaction equation (1) to prepare a poly(ether imide) copolymer having the following random units (II) and (II"):

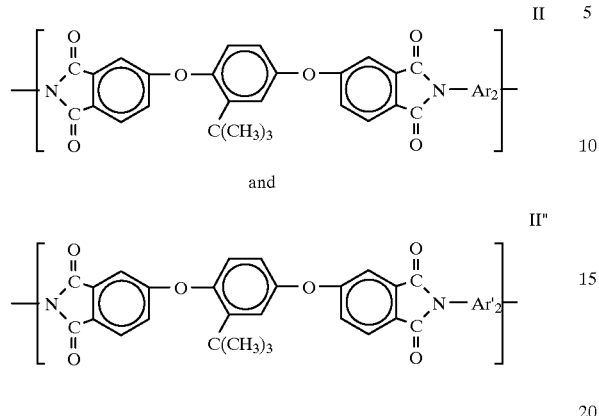

wherein $Ar_2$ is defined as above, and $Ar'_2$ is selected from the group of $Ar_2$ provided that $Ar_2$ and $Ar'_2$ are different from each other.

It can be readily understood that more than one diamines can be used in the above reaction equation (2) to prepare a poly(ether imide) copolymer having the following units (II), (II'), (II''') and (II"") in random:

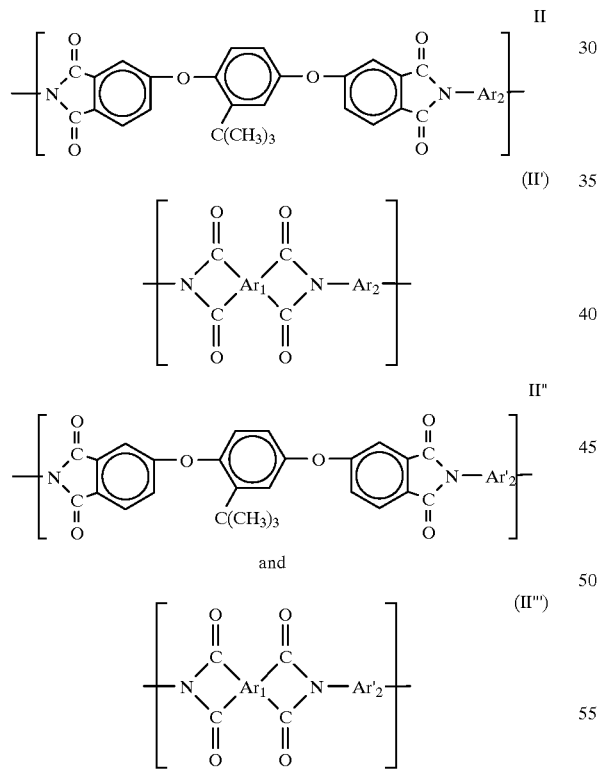

wherein $Ar_1$, $Ar_2$ and $Ar'_2$ are defined as above.
Preferably, $Ar_1$ is

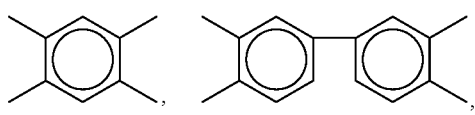

-continued

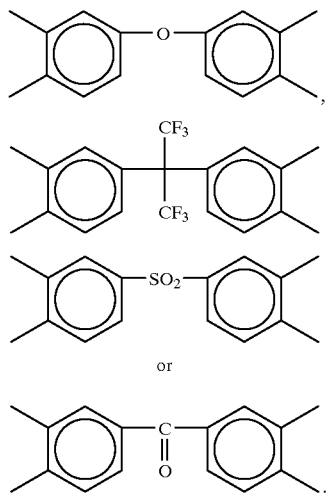

Selectively, $Ar_1$ may be

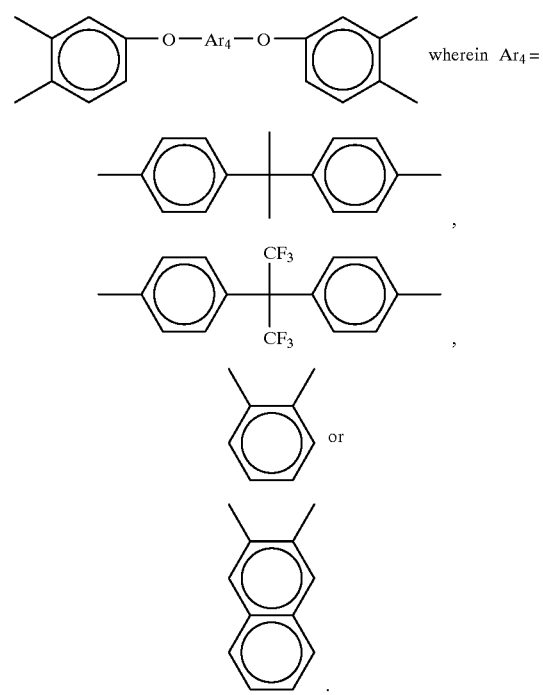

Suitable aromatic diamines for use in the preparation of poly(ether imide) polymers or copolymers in the reaction equations (1), (2) or (3) according to the present invention include (but not limited to) p-phenylenediamine, benzidine, m-phenylenediamine, 4,4'-oxydianiline, 3,4'-oxydianiline, 4,4'-thiodianiline, 4,4'-methylene dianiline, 4,4'-(1,4-phenyleneiisopropylidene)dianiline, 4,4'-(1,3-phenyleneiisopropylidene)dianiline, 4,4'-diaminobenzanilide 2,5-bis(4-aminophenyl)-3,4-diphenylthiophene, 9,9-bis(4-aminophenyl)fluorene, 1,4-bis(4-aminophenoxy)benzene, 1,3-bis(4-aminophenoxy)benzene, 2,5-bis(4-aminophenoxy)toulene, 2,5-bis(4-aminophenoxy)biphenylene, 1,4-bis(4-aminophenoxy)2-tert-butyl benzene, 2,3-bis(4-aminophenoxy)naphthalene, 1,4-bis(4-aminophenoxy)naphthalene, 4,4'-bis(4-aminophenoxy)biphenyl, bis[4-(4-aminophenoxy)phenyl] ether, bis[4-(4-aminophenoxy)phenyl]sulfide, 4,4'-bis(4- aminophenoxy)-3,3',5,5'-tetramethylbiphenyl, 4,4'-bis(4-aminophenoxyl)benzophenone, 2,2-bis[4-(4-aminophenoxy)phenyl]propane, 2,2-bis[4-(4-aminophenoxy)phenyl]hexafluoropropane, 2,2-bis[4-(4-aminophenoxy)phenyl]sulfone, 2,2-bis[4-(3-aminophenoxy)phenyl]sulfone, 2,2-bis[4-(4-aminophenoxy)phenyl]ethylbenzene, 1,1-bis[4-(4-aminophenoxy)phenyl]cyclohexane, 5,5'-bis[4-(4-aminophenoxy)phenyl]hexahydro-4,7-methanoidan, 3,3-bis[4-(3-aminophenoxy)phenyl]phthalide, 3,3-bis[4-(3-aminophenoxy)phenyl]phthalimidine, 9,9-bis[4-(4-aminophenoxy)phenyl]fluorene, 4,4'-[1,4-phenylenebis(isopropylidene-1,4-phenyleneoxy)]dianiline and 4,4'-[1,3-phenylenebis(isopropylidene-1,4-phenyleneoxy)]dianiline. Among them p-phenylenediamine and benzidine are not suitable to use as a sole diamine to react with the bis(ether anhydride) (I).

Poly(ether imide)s of the present invention can be synthesized from bis(ether anhydride) (I) with various aromatic diamines by the conventional two-stage process that includes ring-opening polyaddition to the poly(amic acid)s in an appropriate solvent (such as DMAc) followed by chemical (additions of acetic anhydride and pyridine) or thermal cyclodehydration to the PEIs. Poly(ether imide)s can also be prepared from the conventional one-stage process by heating the two reactants directly in a solvent having a high boiling point (such as m-cresol). Preferably, a colorless poly(ether imide) of the present invention is prepared by the conventional two-stage process and by the chemical cyclodehydration thereof. Any solvents known in the art which can dissolve the bis(ether anhydride) (I) and diamine can be used in the ring-opening polymerization, for examples $CHCl_3$, $CH_2Cl_2$, pyridine, DMAc, NMP, DMF and m-cresol.

A suitable method for synthesizing the novel aromatic bis(ether anhydride) compound (I), 1,4-bis[3,4-dicarboxyphenoxy]-2-tert-butylbenzene dianhydride, includes carrying out a nitrodisplacement reaction between tert-butylhydroquinone (t-BHQ) and 4-nitrophthalodinitrile or 4-nitrophthalodiimide to obtain an intermediate bis(ether) compound, followed by alkaline hydrolysis of the intermediate bis(ether) compound to form a bis(ether diacid) and dehydration of the resulting bis(ether diacid).

The present invention will be further illustrated by the following examples, which are not used to merely limit the scope of the present invention.

EXAMPLE 1

Synthesis of 1,4-Bis(3,4-dicyanophenoxy)-2-tert-butyl benzenedianhydride

①  In a 250-mL flask, 6.23 g (37.5 mmol) of t-BHQ, 12.98 g of 4-nitrophthalodinitrile and 10 g of $K_2CO_3$ were suspended in a mixture of 100 mL of DMF and nitrogen surrounding. The suspended solution showed reddish orange and had $K_2CO_3$ pellet within was stirred at room temperature for about 24 h. Then the brown reaction mixture was poured into 500 mL of water, and the precipitated white solid was collected. The yield of the product was 13.2 g (84% yield) (mp: 231–233° C.). ② In a 500-mL flask, a suspension of bis(ether dinitrile) from stage ① (12.54 g) in an ethanol/water mixture (110 mL/110 mL) containing dissolved 27 g of KOH was boiled under reflux for over 30 hr until the evolution of ammonia had ceased. The resulting hot solution was filtered to remove any possible insoluble impurities. The hot filtrate was allowed to cool and acidified by concentrated HCl to pH=2–3. The white precipitated product [1,4-bis(3,4-dicarboxyphenoxy)-2-tert-butylbenzene] was filtered off, washed with water until neutral, and dried in vacuum, to give yield 14.3 g (98%). ③ In a 200-mL flask, bis(ether diacid) (14 g) from stage ② was suspended in 35 mL of acetic anhydride and 35 mL of glacial acetic acid. The suspension was boiled under reflux until turning into a clear solution. The resulting hot, clear solution was filtered to remove any insoluble impurities. On cooling, the crystallized white powder [1,4-bis(3,4-dicarboxyphenoxy)-2-tert-butylbenzene dianhydride (I)] was collected, and dried in vacuum to give yield 11 g (85%) (mp: 211–213° C.).

IR(KBr): 1848 cm$^{-1}$ (asym. C=O str.), 1780 cm$^{-1}$ (sym. C=O str.), 1478–1615 cm$^{-1}$ (arom. C=C), 1258 cm$^{-1}$ (C—O—C).

$^1$H-NMR (500 MHz, $CDCl_3$): δ (ppm)=1.37 (s, 9H), 7.00 (s, 2H), 7.25 (s, 1H), 7.50 (m, 4H), 8.22 (q, 2H).

$^{13}$C-NMR (125 MHz, $CDCl_3$): δ (ppm)=164.79, 164.66, 162.43, 162.38, 162.00, 151.13, 150.62, 145.15, 134.06, 133.95, 127.86, 127.73, 125.14, 124.81, 124.54, 124.46, 123.23, 120.62, 119.51, 112.98, 112.53, 35.08, 29.97.

Elemental Anal. $C_{26}H_{18}O_8$ (458.4) Calcd: C, 68.12%; H, 3.96% Found: C, 68.04%; H, 3.98%

EXAMPLE 2

1,4-Bis(4-aminophenoxy)benzene (0.292 g) was dissolved in 5.6 mL of dried DMAc in a 50-mL flask. After the diamine was dissolved completely, 0.458 g of bis(ether anhydride) I was added in one portion. The mixture was stirred at room temperature for 1 hr and the poly(ether amic acid) (PAA) was obtained. The inherent viscosity of the resulting poly(ether amic acid) (PAA) in DMAc was 1.32 dL/g, measured at a concentration of 0.5 g/dL at 30° C. A mixture of 1 mL of acetic anhydride and 0.5 mL of pyridine was added to the PAA solution, and the resulting mixture was stirred at 80° C. for 30 min. The mixture was poured into methanol to form white precipitate. The white precipitate was collected by filtration, washed thoroughly with methanol, and dried at 120° C. The yield of the resulting polymer was 0.71 g (100% yield) (mp: 231–233° C.) and the inherent viscosity of the resulting polymer in DMAc was 1.29 dL/g. Elemental Anal. Calcd: C, 73.94; H, 4.23; N, 3.92%, Found: C, 73.11; H, 4.16; N, 3.97%. The resulting polymer could dissolve in DMAc, NMP, DMF, m-cresol, pyridine and $CH_2Cl_2$. A flexible and colorless PEI film (6 cm×0.5 cm×0.5 mm) was obtained by DMAc casting, which has strength at yield point of 108 MPa, tensile strength at break of 102 MPa, elongation at break of 25%, and initial modulus of 2.5 GPa. The resulting polymer has the following formula:

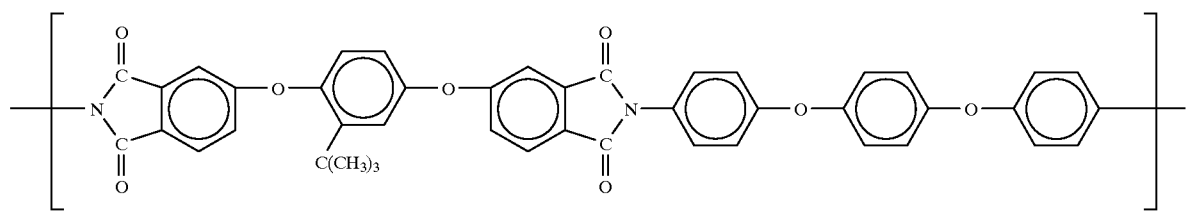

EXAMPLE 3

1 mmol of diamine was dissolved in a suitable amount of dried DMAc in a flask. After the diamine was dissolved completely, 1 mmol of dianhydride was added as a whole or as several delayed portions. The mixture was stirred at room temperature for 1 hr. A high viscosity solution of the resulting poly(ether amic acid) (PAA) was obtained. Then adding a appropriate amount of a mixture of acetic anhydride and pyridine (for example, 1 mL of acetic anhydride and 0.5 mL of pyridine) to the PAA solution. The mixture was stirred at 80–100° C. for 1 hr. The polymer solution was poured into methanol to yield white precipitate which was collected by filtration, washed thoroughly with methanol, and dried at a suitable temperature.

Typical examples are described as follows:

(a) 1 mmol of 2,5-bis(4-aminophenoxy)toluene and 1 mmol of bis(ether anhydride) I was dissolved in 6 mL of dried DMAc in a 50-mL flask to prepare a poly(ether imide) according to the procedures described above. 7.29 g of a colorless polymer was obtained and the polymer has the following formula:

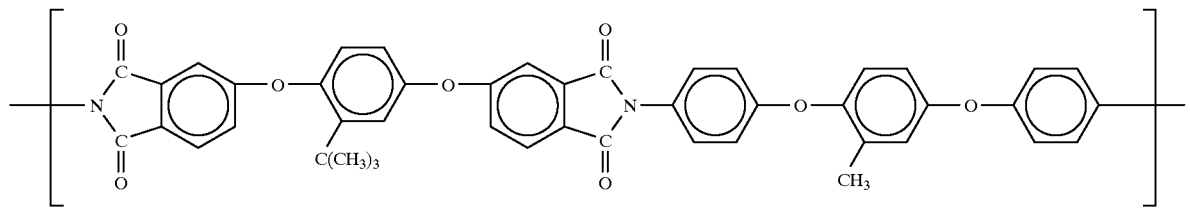

The resulting polymer has an inherent viscosity ($\eta_{inh}$) of 1.07 dL/g and can dissolve in DMAc, NMP, DMF, m-cresol, pyridine and $CH_2Cl_2$. This PEI has thermal properties of: Tg, 232° C.; temperature of 10% weight loss ($T_{10}$) in air being at 505° C. and more than 50 wt % being retained even at 800° C. The mechanical properties of this PEI film (6 cm×0.5 cm×0.5 mm) are: strength at yield point of 117 MPa, tensile strength at break of 133 MPa, elongation at break of 34%, and initial modulus of 2.7 GPa.

(b) 1 mmol of 1,3-bis(4-aminophenoxy)benzene and 1 mmol of bis(ether anhydride) I was dissolved in 6 mL of dried DMAc in a 50-mL flask to prepare a poly(ether imide) according to the procedures described above. 7.14 g of a colorless polymer (100% yield) was obtained and the polymer has the following formula:

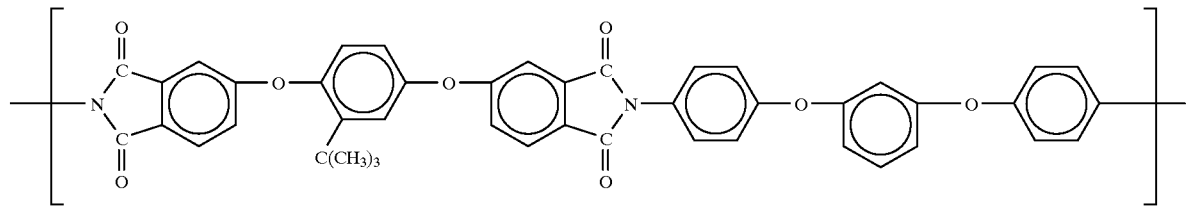

The resulting polymer has an inherent viscosity ($\eta_{inh}$) of 1.44 dL/g in DMAc solution and can dissolve in DMAc, NMP, DMF, m-cresol, pyridine and $CH_2Cl_2$. Thermal properties of the PEI are: Tg, 217° C.; temperature of 10% weight loss ($T_{10}$) in $N_2$ being at 544° C. and more than 54 wt % being retained even at 800° C. This PEI film (6 cm×0.5 cm×0.5 mm) has the following mechanical properties: a strength at yield point of 108 MPa, tensile strength at break of 102 MPa, elongation at break of 42%, and initial modulus of 2.4 GPa.

(c) 29 different PEIs were prepared with various aromatic diamines and the bis(ether anhydride) I according to the procedures described in this example. The color property, solubility and inherent viscosity are shown in Table 1.

EXAMPLE 4

1,4-Bis(4-aminophenoxy)2-tert-butylbenzene (0.348 g) was dissolved in 6.3 mL of dried DMAc in a 50-mL flask. After the diamine was dissolved completely, 0.458 g bis (ether anhydride) I was added. The mixture was stirred at room temperature for 1 hr and a high viscosity poly(ether amic acid) (PAA) was obtained. The inherent viscosity of the resulting PAA in DMAc was 1.31 dL/g, measured at a concentration of 0.5 g/dL at 30° C. The PAA solution was coated on a φ=9-cm glass culture dish, which was placed in a 80° C. oven to remove the solvent. The semidried PAA film was heated in sequence at 120° C., 150° C., 180° C., 210° C., and 250° C. for 15 minutes each. By being soaked in water, a colorless and flexible PEI film was self-stripped off the glass surface. The resulting PEI has an inherent viscosity ($\eta_{inh}$) of 1.27 dL/g in DMAc solution and can dissolve in DMAc, NMP, DMF, m-cresol, pyridine, tetrahydrofuran (THF), $CH_2Cl_2$ and concentrated $H_2SO_4$. Thermal properties of this PEI film are: temperature of 10% weight loss ($T_{10}$) in $N_2$ being at 529° C. and 515° C. in air; and more than 54 wt % remaining even at 800° C. The mechanical properties of the PEI film are: strength at yield point of 119 MPa, tensile strength at break of 109 MPa, elongation at break of 35%, and initial modulus of 2.5 GPa. The colorless resulting polymer film has the following formula:

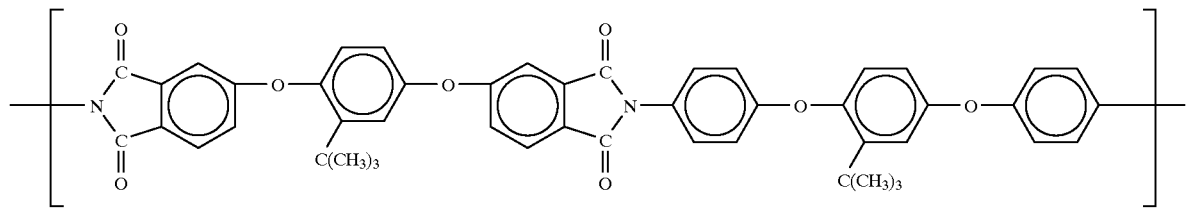

Elemental Anal. Calcd.: C, 74.69%; H, 5.09%; N, 3.63%
Found: C, 73.80%; H, 5.01%; N, 3.64%

EXAMPLE 5

4,4'-Oxydianiline (0.2 g; 1 mmol ) was dissolved in 5 mL of dried DMAc in a 50-mL flask. After the diamine was dissolved completely, 0.229 g (0.5 mmol) bis(ether anhydride) I and 0.222 g (0.5 mmol) 6FDA were added. The resulting mixture was stirred at room temperature for 1 hr, and then a mixture of 1 mL of acetic anhydride and 0.5 mL of pyridine was added. The resulting mixture was stirred at 80° C. for 1 hr, and poured into methanol to form white precipitate. The white precipitate was collected by filtration, washed thoroughly with methanol, and dried at 120° C. The yield of the resulting polymer was 6.14 g. The resulting polymer has an inherent viscosity of 1.20 dL/g in DMAc. The resulting polymer can dissolve in DMAc, NMP, DMF, pyridine, $CHCl_3$ and $CH_2Cl_2$ and has the following formula:

EXAMPLE 6

2,2-Bis[4-(4-aminophenoxy)benzene]propane was dissolved in dried DMAc, and 4,4'-oxydiphthalic anhydride (ODPA) was added after the diamine was dissolved completely. The mixture was stirred at room temperature for 1 hr, and then a mixture of 1 mL of acetic anhydride and 0.5 mL of pyridine was added to the PAA solution. The resulting mixture was stirred at 80° C. for 1 hr, and was poured into methanol to form white precipitate. The white precipitate was collected by filtration, washed thoroughly with methanol, and dried at 120° C. The resulting polymer having the following formula has 1.12 dL/g inherent viscosity in DMAc and can dissolve in DMAc, NMP, DMF, pyridine and $CHCl_3$:

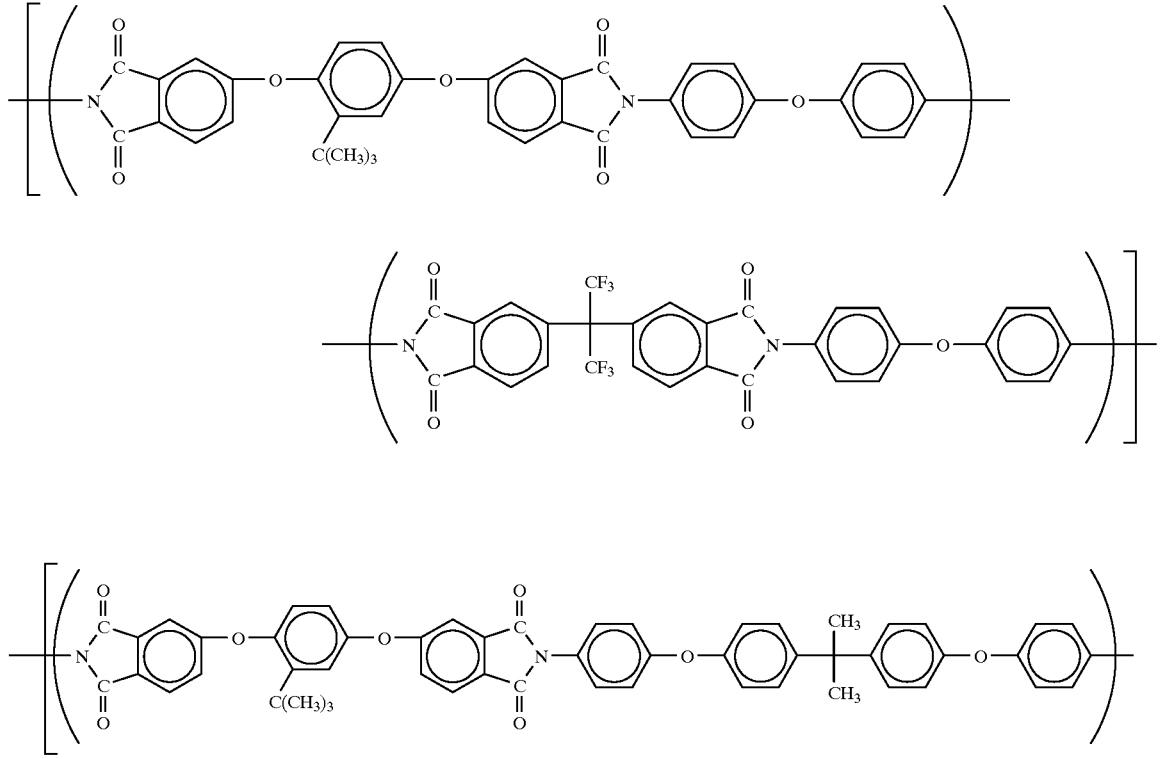

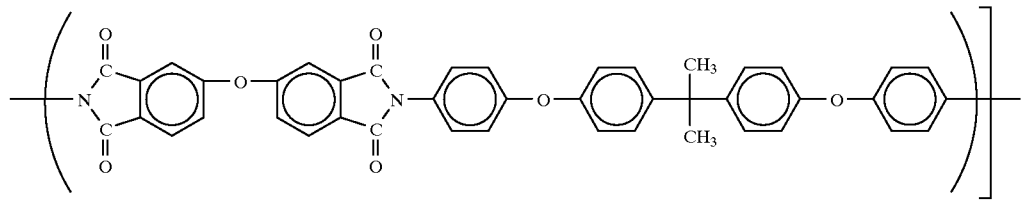

EXAMPLE 7

2,5-Bis(4-aminophenoxy)toluene (0.306 g; 1 mmol) was dissolved in 6 mL of fresh distillated m-cresol in a 50-mL flask, and 0.229 g (0.5 mmol) bis(ether anhydride) I and 0.222 g (0.5 mmol) 6FDA were added after the diamine was dissolved completely. The mixture was stirred at 60° C. for 30 min, and stirred at 200° C. in $N_2$ for 2 hr, and poured into methanol to form white precipitate. The white precipitate was collected by filtration. The resulting polymer has 1.20 dL/g inherent viscosity in DMAc and can dissolve in DMAc, NMP, DMF, pyridine and m-cresol.

EXAMPLE 8

In order to show the colorless characteristic of the poly (ether imide)s of the present invention in comparison with the conventional PIs films, four different PIs (polymer ①, ②, ③ and ④) were prepared and the coloration thereof were determined by UV-160A and ZE2000 (Simadzu UV-160A and Macbeth coloy-eye ZE2000). The Chemical structures and the inherent viscosity of the PIs (polymer ①, ②, ③ and ④) were shown in following formulas:

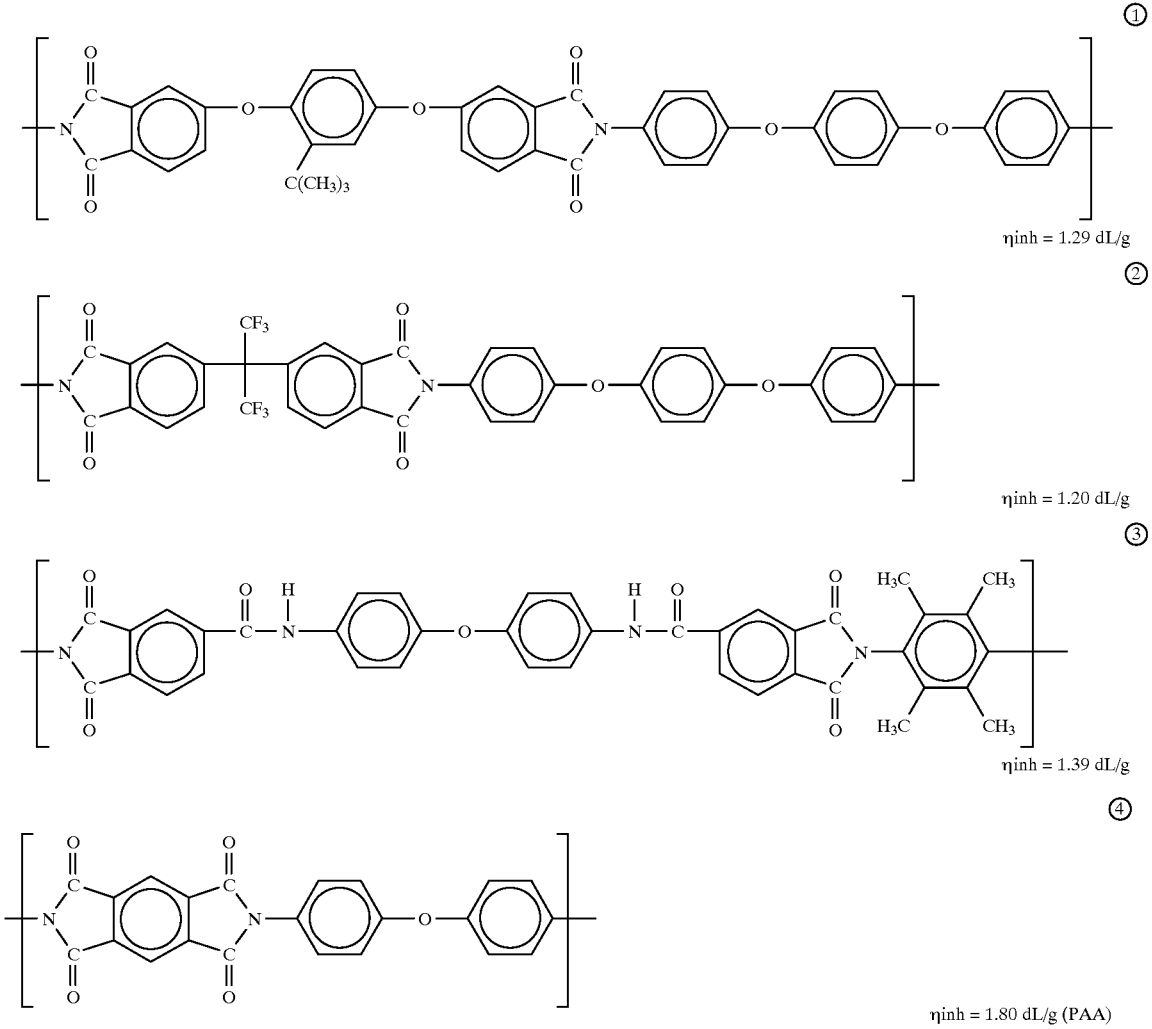

Preparation of various polymers (polymer ①, ②, ③ and ④)

The polymer ① was prepared according to the same procedures as described in Example 2; the polymer ② was prepared from 6FDA and 1,4-bis(4-aminophenoxy)benzene according to procedures similar to those described in Example 2; the polymer ③ was prepared from the bis (trimellitimide) of tetramethyl-p-phenylenediamine with 4-4'-oxydianiline by direct polycondensation; and the polymer ④ was synthesized from the ring-opening reaction of PMDA and 4,4'-oxydianiline (4,4'ODA) to a poly(amic acid) in DMAc followed by thermal cyclodehydration. The coloration of all polymers (polymer ①, ②, ③ and ④) were determined by Macbeth Color-eye. Measurements were performed with films about 0.05 mm thick, observational angle was 10°, illuminant was CIE-D, and color difference equation used was CIE LAB. FIG. 1 showed visible light absorption spectra of 0.05 mm of the four polymer films (polymer ①, ②, ③ and ④) in the wavelength of 300 $\mu$m–600 $\mu$m. The absorption spectra of polymer ③ and ④ show an absorption at 500–460 $\mu$m and exhibit a more deep-yellow coloration. Among the polymer ①, ②, ③ and ④, polymer ① and ② show lighter color than the polymer ③ and ④. Polymer ① shows more colorless than polymer ② because an initial absorption wavelength of the polymer ② is greater than that of the polymer ①. Furthermore, the colorless results of the polymer ① and ② determined by the Macbeth coloy-eye were listed as follows:

Polymer①: DL (94.59), DA (−4.84), and DB (9.34)

Polymer②: DL (77.75), DA (−0.66), and DB (51.53)

The color is quantitatively described by parameters DA and DB. For instances, a red sample has a positive DA value, and a green sample possesses a negative DA value. Similarly, positive DB means yellow color, while negative DB implies blue color. For colorless film, the values of DA and DB are 0. The DB of PEI of the present invention (polymer ①) was more close to zero than the conventional PIs (polymers ②, ③ and ④). In particular, the PEI of the present invention (polymer ①) is more close to colorless than the PI based on 6FDA (polymer ②) which is the best colorless PI ever known.

More PEIs of the present invention and conventional PIs were synthesized, and their properties are shown in Table 2.

TABLE 1

The properties of various polymers[a] in inherent viscosity[b], solubility[c] and color[d].

| Code | $\eta_{inh}$ | Solvent | | | | | Color |
|---|---|---|---|---|---|---|---|
| | | NMP | DMAc | DMF | m-cresol | $CH_2Cl_2$ | |
| 1 | 0.70 | + | + | + | + | + | CL |
| 2 | 0.94 | + | + | + | + | + | CL |
| 3 | 0.53 | + | + | + | + | + | CL |
| 4 | 1.00 | + | + | + | + | + | CL |
| 5 | 0.56 | + | + | + | + | + | CL |
| 6 | 1.29 | + | + | + | + | + | CL |
| 7 | 1.44 | + | + | + | + | + | CL |
| 8 | 1.07 | + | + | + | + | + | CL |
| 9 | 1.27 | + | + | + | + | + | CL |
| 10 | 1.15 | + | + | + | + | + | CL |
| 11 | 0.73 | + | + | + | + | + | CL |
| 12 | 1.76 | + | + | − | + | + | CL |
| 13 | 0.54 | + | + | + | + | + | CL |
| 14 | 1.08 | + | + | + | + | + | CL |
| 15 | 1.00 | + | + | + | + | + | CL |
| 16 | 1.05 | + | + | + | + | + | CL |
| 17 | 1.11 | + | + | + | + | + | CL |
| 18 | 1.09 | + | + | −s | + | + | CL |
| 19 | 1.05 | + | + | + | + | + | CL |
| 20 | 0.82 | + | + | + | + | + | CL |
| 21 | 0.85 | + | + | + | + | + | CL |
| 22 | 0.95 | + | + | + | + | + | CL |
| 23 | 1.08 | + | + | −s | + | + | CL |
| 24 | 0.99 | + | + | + | + | + | CL |
| 25 | 0.64 | + | + | + | + | + | CL |
| 26 | 0.85 | + | + | −s | + | + | CL |
| 27 | 0.55 | + | + | + | + | + | CL |
| 28 | 0.86 | + | + | + | + | + | CL |
| 29 | 1.13 | + | + | + | + | + | CL |

[a]

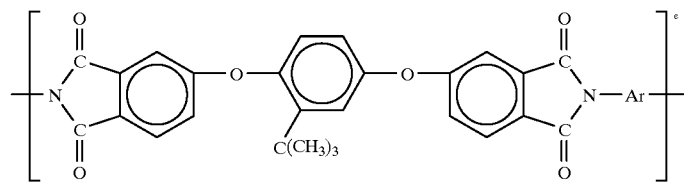

obtained by chemical cyclodehydration method.
[b]Measured at a concentration of 0.5 g/100 mL DMAc solution (30° C.).
[c]Measured at a concentration of 0.5 wt %; +: soluble at room temperature; −: insoluble; −s: swelling.

TABLE 1-continued

The properties of various polymers[a] in inherent viscosity[b], solubility[c] and color[d].

| Code | $\eta_{inh}$ | Solvent | | | | | Color |
|------|--------------|---------|------|-----|----------|-----------|-------|
|      |              | NMP     | DMAc | DMF | m-cresol | $CH_2Cl_2$ |       |

[d]C.L showed colorless.
[e]wherein Ar =

—⟨⟩— , (1)

—⟨⟩—O—⟨⟩— , (2)

—⟨⟩—O—⟨⟩— , (3)

—⟨⟩—$CH_2$—⟨⟩— , (4)

—⟨⟩—S—⟨⟩— , (5)

—⟨⟩—O—⟨⟩—O—⟨⟩— , (6)

—⟨⟩—O—⟨⟩—O—⟨⟩— , (7)

—⟨⟩—O—⟨⟩—O—⟨⟩— ,
          |
          $CH_3$ (8)

TABLE 1-continued

The properties of various polymers[a] in inherent viscosity[b], solubility[c] and color[d].

| Code | $\eta_{inh}$ | Solvent | | | | | Color |
|------|--------------|---------|------|-----|---------|-----------|-------|
|      |              | NMP     | DMAc | DMF | m-cresol | $CH_2Cl_2$ |       |

(9)

(10)

(11)

(12)

(13)

(14)

TABLE 1-continued

The properties of various polymers[a] in inherent viscosity[b], solubility[c] and color[d].

| | | Solvent | | | | | |
|---|---|---|---|---|---|---|---|
| Code | $\eta_{inh}$ | NMP | DMAc | DMF | m-cresol | $CH_2Cl_2$ | Color |

(15)

(16)

(17)

(18)

(19)

(20)

(21)

(22)

TABLE 1-continued

The properties of various polymers[a] in inherent viscosity[b], solubility[c] and color[d].

| Code | $\eta_{inh}$ | Solvent | | | | | Color |
|---|---|---|---|---|---|---|---|
| | | NMP | DMAc | DMF | m-cresol | $CH_2Cl_2$ | |

(23)

(24)

(25)

(26)

(27)

(28)

TABLE 1-continued

The properties of various polymers[a] in inherent viscosity[b], solubility[c] and color[d].

| Code | $\eta_{inh}$ | Solvent | | | | | Color |
|------|--------------|---------|---|---|---|---|-------|
| | | NMP | DMAc | DMF | m-cresol | $CH_2Cl_2$ | |

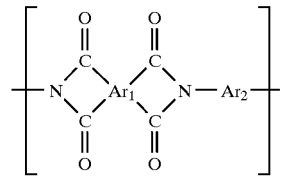

(29)

TABLE 2

Color Data of Polymer Films

| Code | Calculated Data[a] | | |
|------|------|-------|-------|
|      | DB   | DA    | DL    |
| paper  | −0.82 | 0.94 | 93.06 |
| I-a    | 4.30  | −2.67 | 91.17 |
| I-b    | 9.85  | −5.25 | 92.32 |
| I-c    | 7.38  | −3.93 | 92.28 |
| I-d    | 6.43  | −4.16 | 92.74 |
| I-e    | 21.20 | −8.39 | 91.33 |
| I-f    | 14.43 | −2.61 | 88.82 |
| I-g    | 15.37 | −2.01 | 88.57 |
| 6FDA-a | 22.29 | −6.13 | 88.96 |
| 6FDA-b | 25.14 | −11.05 | 92.34 |
| 6FDA-c | 35.50 | −6.22 | 86.27 |
| 6FDA-d | 27.41 | −11.39 | 91.66 |
| 6FDA-e | 28.31 | −11.83 | 91.99 |
| 6FDA-f | 31.61 | −4.32 | 86.45 |

TABLE 2-continued

Color Data of Polymer Films

| Code | Calculated Data[a] | | |
|------|------|-------|-------|
|      | DB   | DA    | DL    |
| 6FDA-g | 33.38 | −3.92 | 87.23 |
| PMDA-c | 47.63 | 21.81 | 61.01 |
| PMDA-d | 79.06 | 10.46 | 78.88 |
| PMDA-e | 69.42 | 21.60 | 72.17 |
| PMDA-g | 71.95 | 16.69 | 76.76 |

[a]Standard: Paper; Calculation Eq.: CIE LAB.
DB value "+" tends to yellow; "−" tends to blue.
DA value "+" tends to red, "−" tends to green.
DL value from 100 to 0 means from white to black.
b. The polymer code has two portions, wherein the first portion before "−" represents the $Ar_1$, and the second portion after "−" is the $Ar_2$.

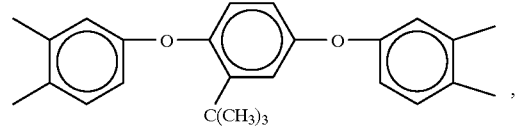

wherein $Ar_1$ =

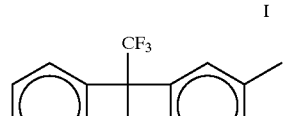

I

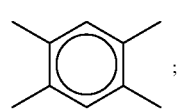

6FDA

PMDA $Ar_2$ =

-continued
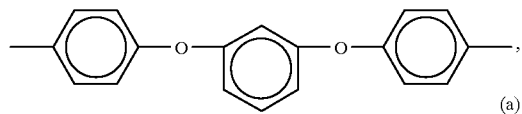
(a)
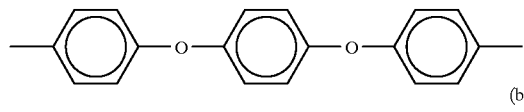
(b)
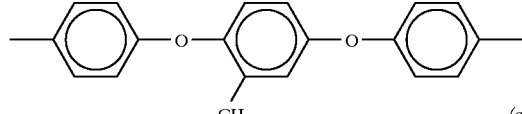
(c)
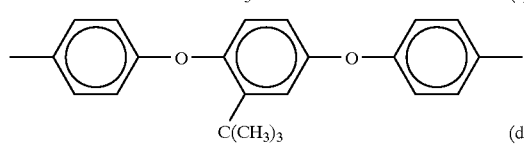
(d)
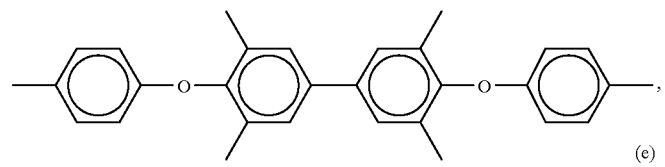
(e)
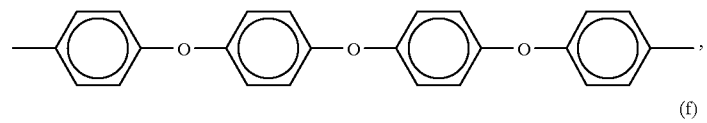
(f)
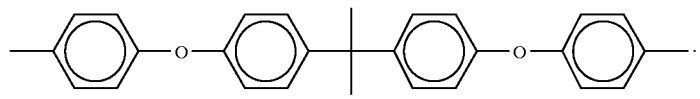
(g)
What is claimed is:
1. A organosoluble poly(ether imide) comprising units represented by the following formula (II):
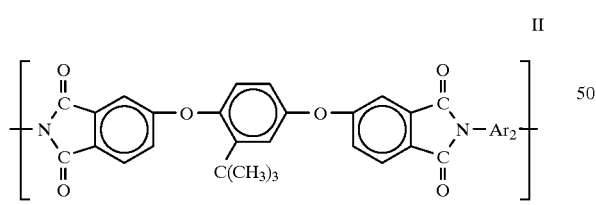
II
wherein $Ar_2$ is selected from the group consisting essentially of
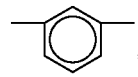
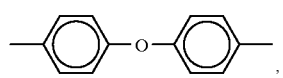
-continued
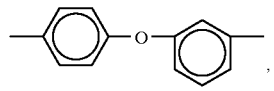
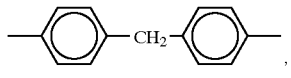
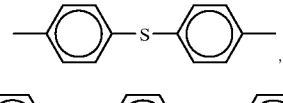
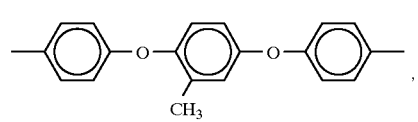

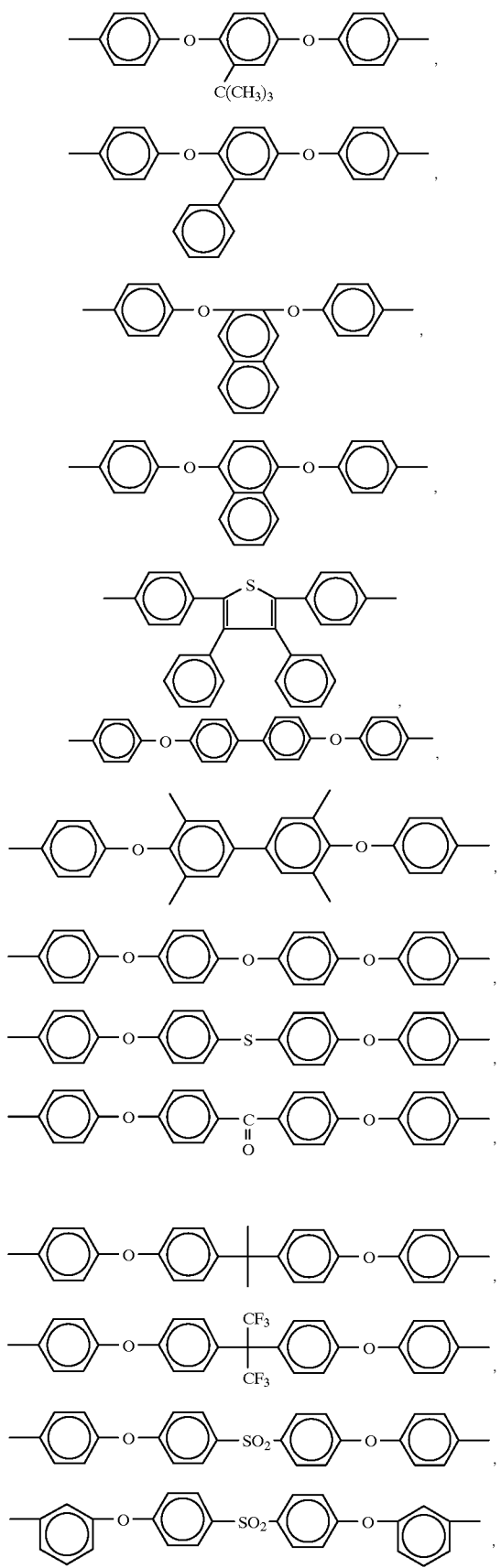
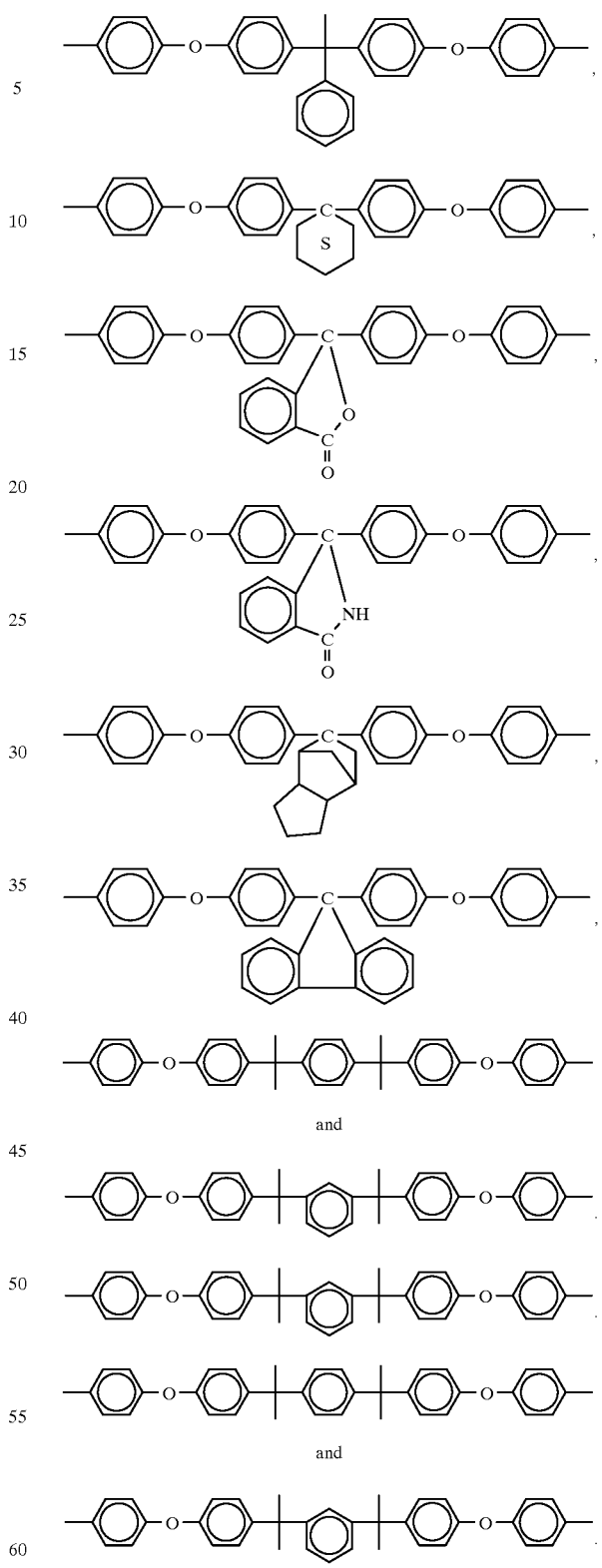
2. The poly(ether imide) according to claim 1 further comprising units represented by the following formula (II'), wherein said units (II) and (II') are in random

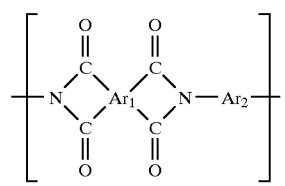
(II')

wherein Ar$_2$ is defined as in the formula (II), and Ar$_1$ is selected from the group consisting essentially of

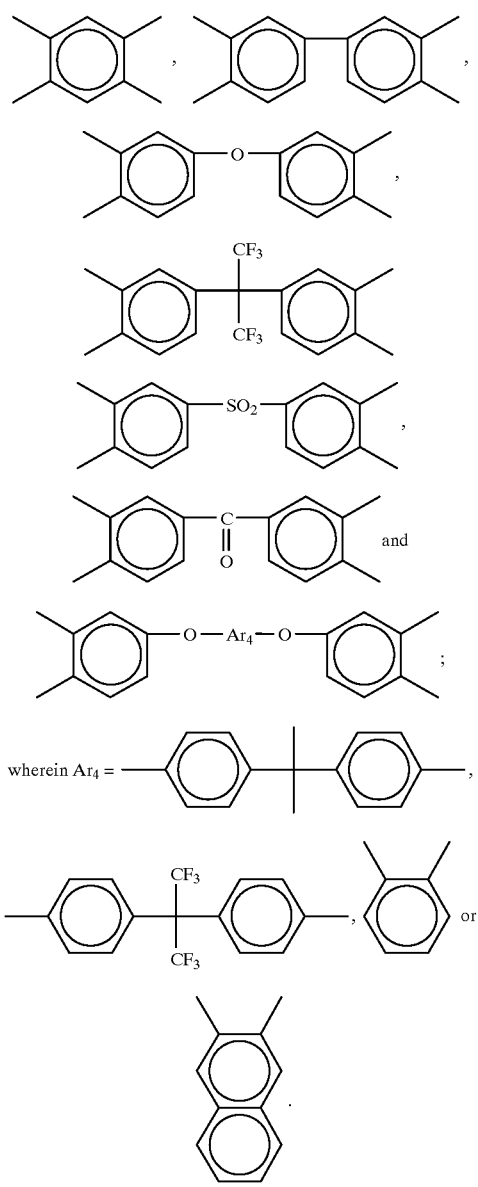

wherein Ar$_4$ =

3. The poly(ether imide) according to claim 1 further comprising units represented by the following formula (II"), wherein said units (II) and (II") are in random

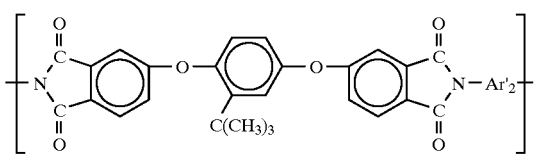
(II")

wherein Ar'$_2$ is selected from the same group of Ar$_2$ provided that Ar$_2$ and Ar'$_2$ are not the same.

4. The poly(ether imide) according to claim 3 further comprising units represented by the following formula (II') and (II'"), wherein said units (II), (II'), (II") and (II'") are in random

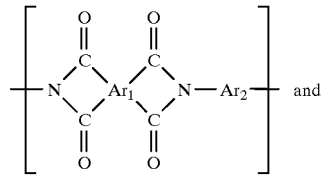
(II')

and

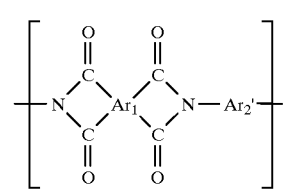
(II'")

wherein Ar$_2$ has the same definition as in the formula (II), and Ar'$_2$ is defined as in the formula (II"), and Ar$_1$ is selected from the group consisting essentially of

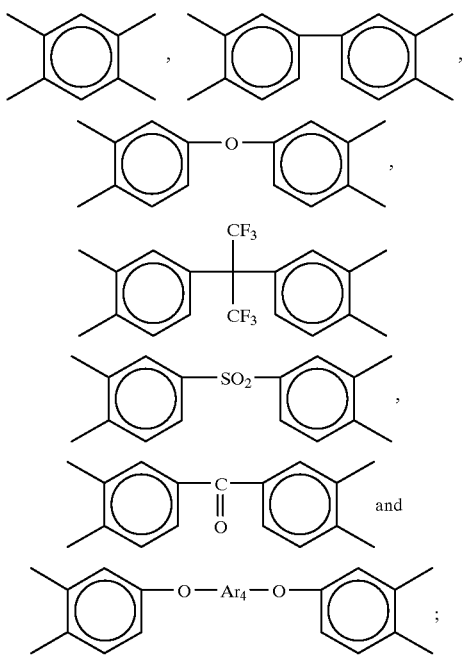

-continued wherein Ar₄ = 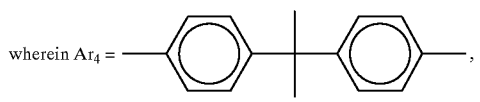

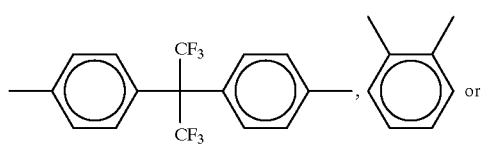

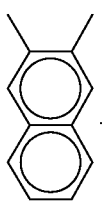

5. The poly(ether imide) according to claim 2, wherein Ar₁ is

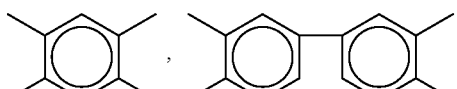

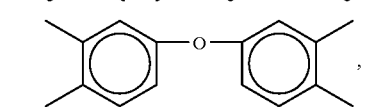

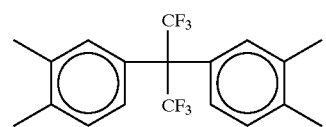

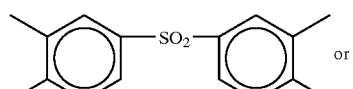

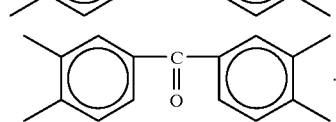

6. The poly(ether imide) according to claim 2, wherein Ar₁ is

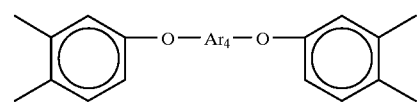

wherein Ar₄ = 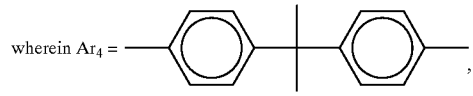

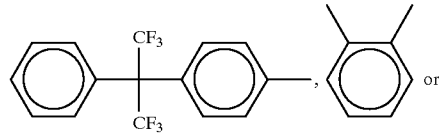

-continued

7. The poly(ether imide) according to claim 2, wherein

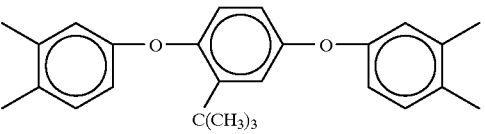

Ar₁ (by weight) = 100: 0~5: 95.

8. An organic solution of poly(ether imide) comprising an organic solvent and a poly(ether imide) which dissolve in said organic solution, wherein the organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, chloromethane, and chloroethane; and said poly(ether imide) comprising units represented by the following formula (II):

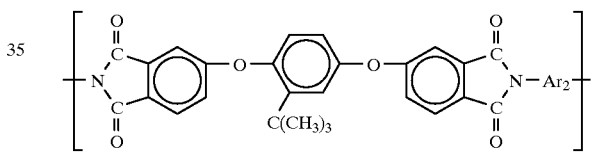

II wherein Ar₂ is selected from the group consisting essentially of

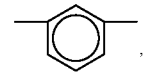

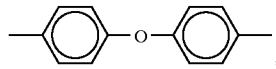

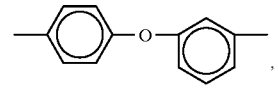

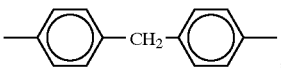

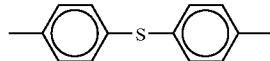

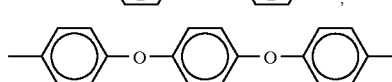

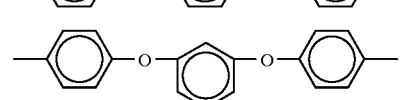

-continued
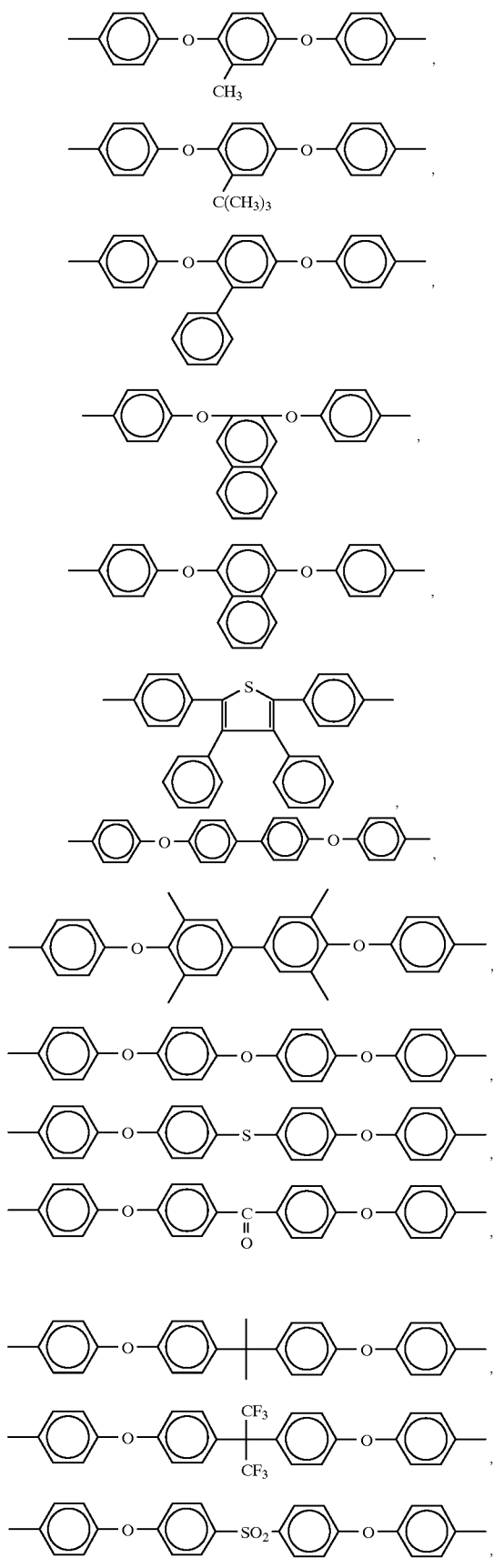
-continued
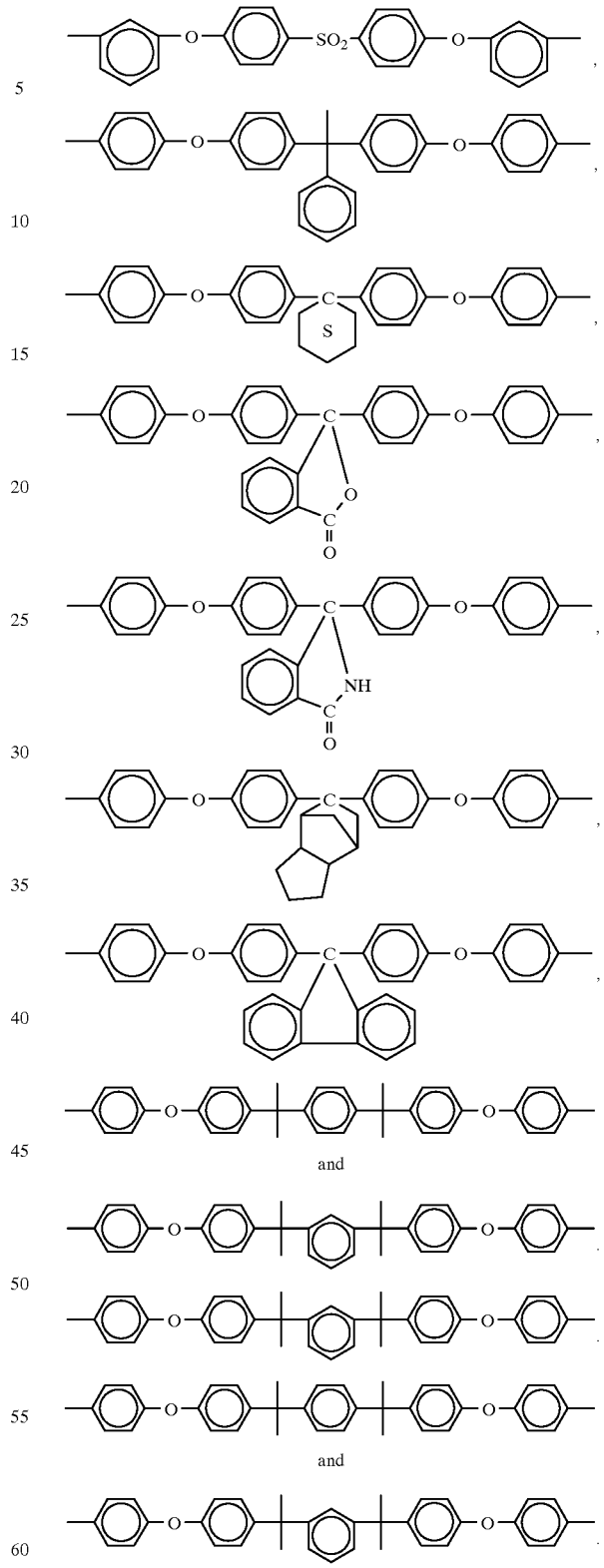
and
9. The organic solution according to claim 8 further comprising units represented by the following formula (II'), wherein said units (II) and (II') are in random

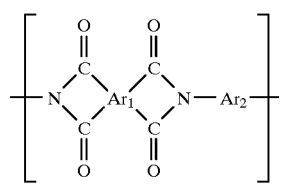
(II')

wherein $Ar_2$ is defined as in the formula (II), and $Ar_1$ is selected from the group consisting essentially of

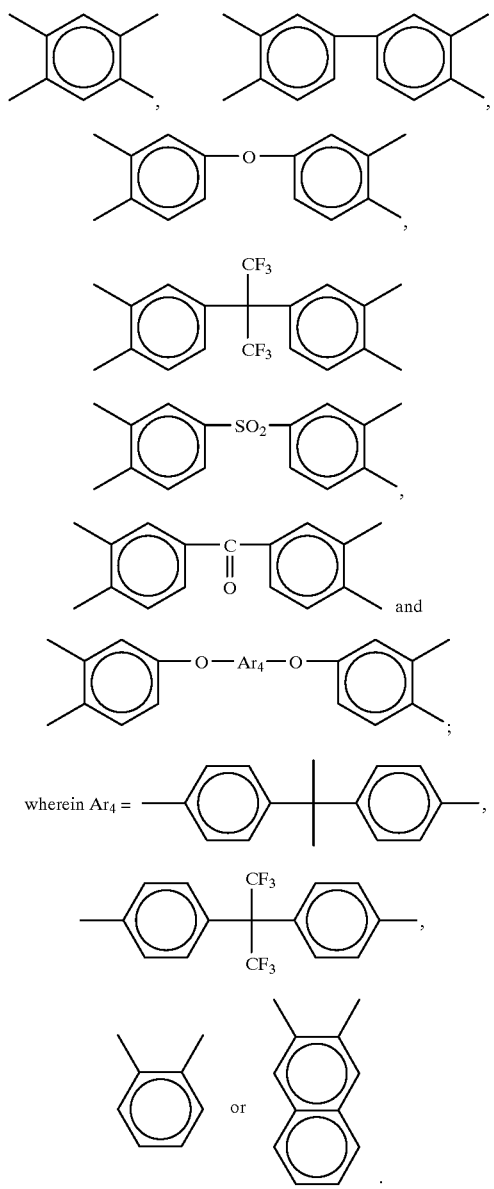

wherein $Ar_4 = $

10. The organic solution according to claim 8 further comprising units represented by the following formula (II"), wherein said units (II) and (II") are in random

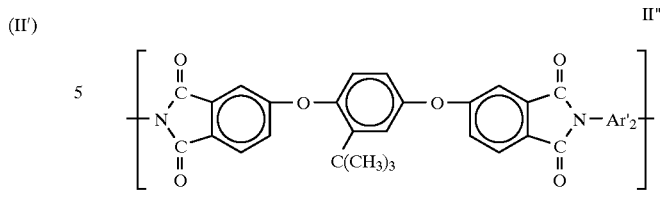
(II")

wherein $Ar'_2$ is selected from the same group of $Ar_2$ provided that $Ar_2$ and $Ar'_2$ are not the same.

11. The organic solution according to claim 10 further comprising units represented by the following formula (II') and (II'''), wherein said units (II), (II'), (II")and (II''') are in random

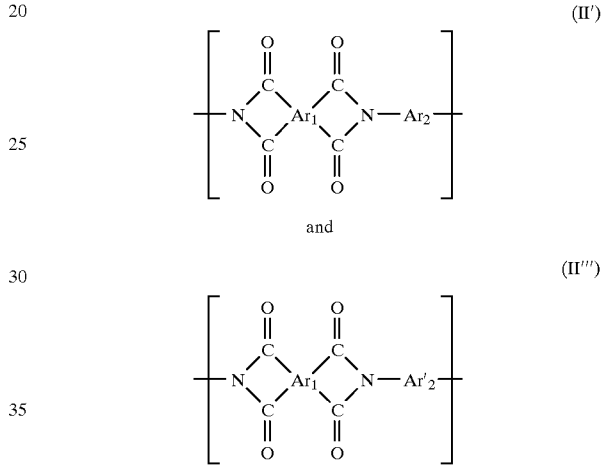
(II')

and (II''')

wherein $Ar_2$ has the same definition as in the formula (II), and $Ar'_2$ is defined as in the formula (II"), and $Ar_1$ is selected from the group consisting essentially of

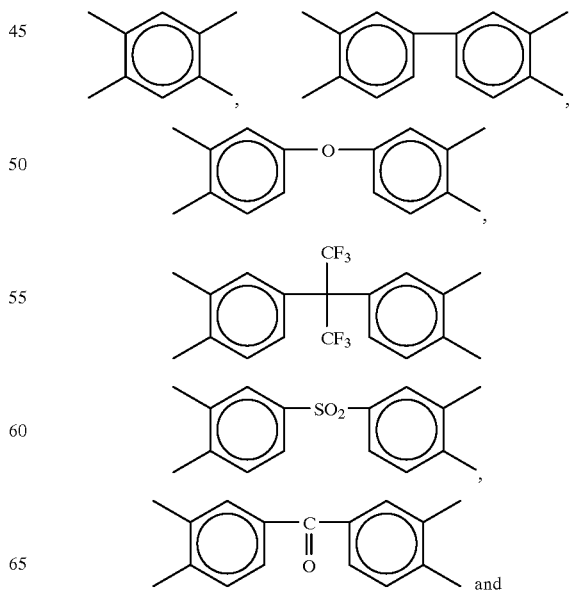

and

-continued

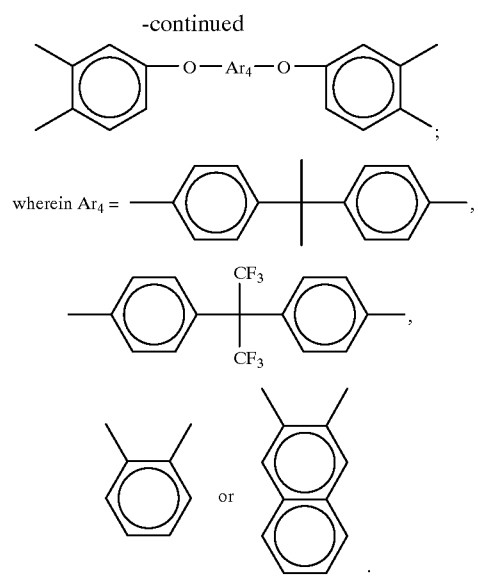

12. The organic solution according to claim 9, wherein Ar₁ is

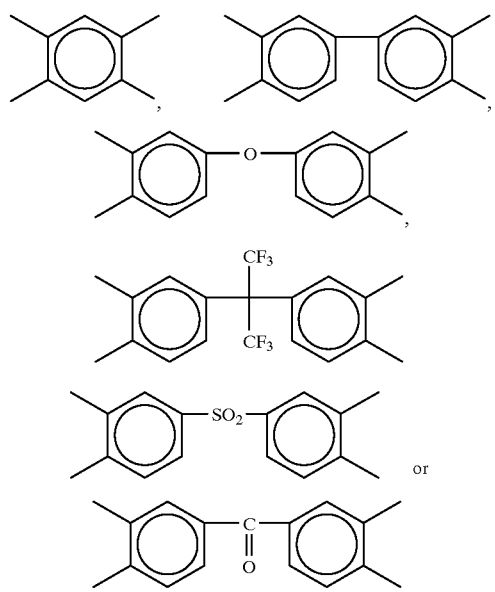

13. The organic solution according to claim 9, wherein Ar₁ is

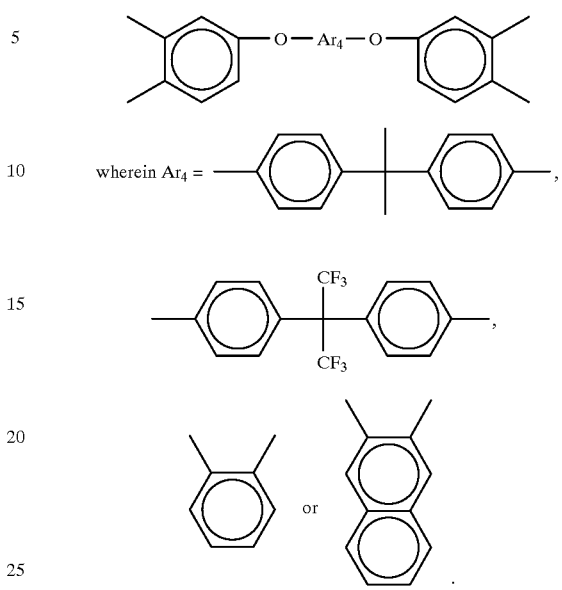

14. The organic solution according to claim 9, wherein

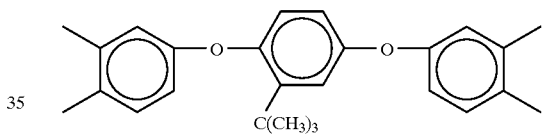

$Ar_1$ (by weight) = 100:0 ~ 5:95.

15. A method for forming a poly(ether imide) film comprising the following steps: mixing the poly(ether imide) in claim 1 and an organic solvent to form an organic solution of said poly(ether imide); casting or coating said organic solution on a substrate to form a layer; and removing said solvent from said layer to form a poly(ether imide) film.

* * * * *